US012271593B1

(12) United States Patent
Shende et al.

(10) Patent No.: US 12,271,593 B1
(45) Date of Patent: Apr. 8, 2025

(54) ADJACENT-PAGE-ASSISTED MEMORY DECODER AND METHOD

(71) Applicant: Marvell Asia Pte Ltd, Singapore (SG)

(72) Inventors: Nirmal V. Shende, Manteca, CA (US); Nedeljko Varnica, San Jose, CA (US); Mats Oberg, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 74 days.

(21) Appl. No.: 18/309,417

(22) Filed: Apr. 28, 2023

Related U.S. Application Data

(60) Provisional application No. 63/340,066, filed on May 10, 2022.

(51) Int. Cl.
*G06F 11/10* (2006.01)
*G06F 3/06* (2006.01)
(52) U.S. Cl.
CPC ............ *G06F 3/061* (2013.01); *G06F 3/0644* (2013.01); *G06F 3/0673* (2013.01)
(58) Field of Classification Search
CPC .. G06F 11/10; G06F 11/1048; G06F 12/0246; G06F 2212/1032
See application file for complete search history.

(56) References Cited

U.S. PATENT DOCUMENTS 10,515,712 B1 * 12/2019 Hsiao ................... G11C 11/4087
2013/0185599 A1 * 7/2013 Alhussien ........... G06F 11/1048
714/42

* cited by examiner

*Primary Examiner* — Yong J Choe

(57) ABSTRACT

A memory device includes a plurality of memory cells. Each memory cell stores a plurality of signal levels representing a plurality of values corresponding to a respective plurality of bits, bits in corresponding respective positions of significance across the plurality of memory cells constituting respective memory pages of the memory device. The memory device also includes decoding circuitry to decode each bit value of one of the respective memory pages using bit values read from at least one other one of the respective memory pages, adjacent to the one of the respective memory pages. The plurality of signal levels may represent the plurality of values according to a Gray code. The decoding circuitry may be configured to compare each signal level to a set of voltage thresholds, and to decode a subset of the plurality of signal levels using fewer than all voltage thresholds in the set of voltage thresholds.

23 Claims, 13 Drawing Sheets

ADJACENT-PAGE-ASSISTED MEMORY DECODER AND METHOD

CROSS REFERENCE TO RELATED APPLICATION

This disclosure claims the benefit of commonly-assigned U.S. Provisional Patent Application No. 63/340,066, filed May 10, 2022, which is hereby incorporated by reference herein in its entirety.

FIELD OF USE

This disclosure relates to improved decoding of bit values in memory devices. More particularly, this disclosure relates to adjacent-page-assisted memory decoding, in which bit values, from a memory page adjacent to the memory page being decoded in a current decoding operation, are used to assist the decoding operation.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Typically, when decoding data read from a memory device, the bit values of a particular memory page are decoded independently, which may or may not result in successful decoding of bit values.

SUMMARY

In accordance with implementations of the subject matter of this disclosure, a memory device includes a plurality of memory cells, each memory cell storing a plurality of signal levels representing a plurality of values corresponding to a respective plurality of bits, bits in corresponding respective positions of significance across the plurality of memory cells constituting respective memory pages of the memory device, and decoding circuitry configured to decode each bit value of one of the respective memory pages using bit values read from at least one other one of the respective memory pages, adjacent to the one of the respective memory pages.

In a first implementation of such a memory device, each of the plurality of signal levels may represent the plurality of values according to a Gray code.

According to a first aspect of that first implementation, the decoding circuitry may be configured to compare each signal level in each memory cell to voltage thresholds in a set of voltage thresholds, and when using bit values read from at least one other one of the respective memory pages, the decoding circuitry may be configured to decode bit values for a subset of the plurality of signal levels using fewer than all voltage thresholds in the set of voltage thresholds.

According to a second aspect of that first implementation, the decoding circuitry may further be configured to assign to each respective decoded bit a respective value representing probability of the respective bit being a '1' or a '0', based on the bit values read from at least one other one of the respective memory pages, adjacent to the one of the respective memory pages, and the memory device may further include error correction circuitry that operates on the respective value representing the probability of the respective bit being a '1' or a '0', to correct the respective decoded bit.

In a first instance of that second aspect, the respective value representing the probability of the respective bit being a '1' or a '0' may be a log-likelihood ratio.

In a first alternative of that first instance, the decoding circuitry may further be configured to modify a magnitude of the log-likelihood ratio based on values read from at least one other one of the respective memory pages, adjacent to the one of the respective memory pages.

In a second implementation of such a memory device, the decoding circuitry may be configured to use the bit values read from at least one of the respective memory pages, adjacent to the one of the respective memory pages, only after failure to decode without using the bit values read from the at least one other one of the respective memory pages.

According to a first aspect of that second implementation, the decoding circuitry may be configured to use the bit values read from at least one of the respective memory pages only after a threshold number of failures to decode without using the bit values read from the at least one other one of the respective memory pages.

According to a second aspect of that second implementation, the decoding circuitry may be configured to use the bit values read from at least one of the respective memory pages only after a result of decoding, without using the bit values read from the at least one other one of the respective memory pages, has accuracy below a threshold level of accuracy.

According to a third aspect of that second implementation, the decoding circuitry may be configured to use the bit values read from at least one of the respective memory pages only after performing an unsuccessful read-retry operation that retries the decoding using, in order, each of a plurality of entries in a read-retry table of voltage thresholds, without using the bit values read from the at least one other one of the respective memory pages.

In a first instance of that third aspect, the decoding circuitry may further be configured to assign a value representing probability of each bit being a '1' or a '0', based on the adjacent page bit values, and the memory device may further include error correction circuitry that operates on the value representing the probability of the bit being a '1' or a '0'.

In a second instance of that third aspect, the decoding circuitry may further be configured to use the bit values read from at least one of the respective memory pages only after performing an unsuccessful read-retry operation that retries the decoding using, in order, each of a plurality of entries in a read-retry table of voltage thresholds, without using the bit values read from the at least one other one of the respective memory pages, and performing a threshold number of failures to decode without using the bit values read from the at least one other one of the respective memory pages.

In a third implementation of such a memory device, the decoding circuitry may be configured to use the bit values read from the at least one other one of the respective memory pages, adjacent to the one of the respective memory pages, independent of the correctness of the bit values read from the at least one other one of the respective memory pages, adjacent to the one of the respective memory pages.

In accordance with implementations of the subject matter of this disclosure, a decoding method for a memory device, the device having a plurality of memory cells, each memory cell storing a plurality of signal levels representing a plurality of values corresponding to a respective plurality of bits, bits in corresponding respective positions of significance across the plurality of memory cells constituting respective memory pages of the memory device, includes reading bit values from at least one respective memory page, and using the bit values of the at least one other one of the respective memory pages, adjacent to the at least one respective memory page, to decode bit values of the at least one respective memory page.

A first implementation of such a decoding method may further include mapping the plurality of signal levels to the plurality of values using a Gray code.

A first aspect of that first implementation may further include comparing each signal level in each memory cell to voltage thresholds in a set of voltage thresholds, where using bit values read from at least one other one of the respective memory pages may include reading bit values for a subset of the plurality of signal levels using fewer than all voltage thresholds in the set of voltage thresholds.

A second aspect of that first implementation may further include assigning to each respective bit being decoded a respective value representing a probability of the bit being a '1' or a '0', based on the adjacent page bit values, and correcting the respective bit based on the respective value representing the probability of the bit being a '1' or a '0'.

In a first instance of that second aspect, assigning to each respective bit a respective value representing the probability of the bit being a '1' or a '0', based on the adjacent page bit values, may include assigning a log-likelihood ratio as the respective value representing the probability of the bit being a '1' or a '0'.

A second implementation of such a decoding method may further include, prior to using the bit values of the at least one other one of the respective memory pages, adjacent to the at least one respective memory page, to decode bit values of the at least one respective memory page, attempting unsuccessfully to decode the bit values of the respective memory page without using the bit values read from the at least one other one of the respective memory pages.

According to a first aspect of that second implementation, attempting unsuccessfully to decode the bit values of the at least one respective memory page may include making a threshold number of unsuccessful attempts to decode without using the bit values read from the at least one other one of the respective memory pages.

According to a second aspect of that second implementation, attempting unsuccessfully to decode the bit values of the at least one respective memory page may include decoding, without using the bit values read from the at least one other one of the respective memory pages, with an accuracy below a threshold level of accuracy.

According to a third aspect of that second implementation, attempting unsuccessfully to decode the bit values of the at least one respective memory page may include performing an unsuccessful read-retry operation that retries the decoding using, in order, each of a plurality of entries in a read-retry table of voltage thresholds, without using the bit values read from the at least one other one of the respective memory pages.

In a third implementation of such a decoding method, using the bit values of the at least one other one of the respective memory pages, adjacent to the one of the respective memory pages, to decode bit values of the at least one respective memory page, may be performed without regard to the correctness of the bit values read from the at least one other one of the respective memory pages, adjacent to the at least one respective memory page.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
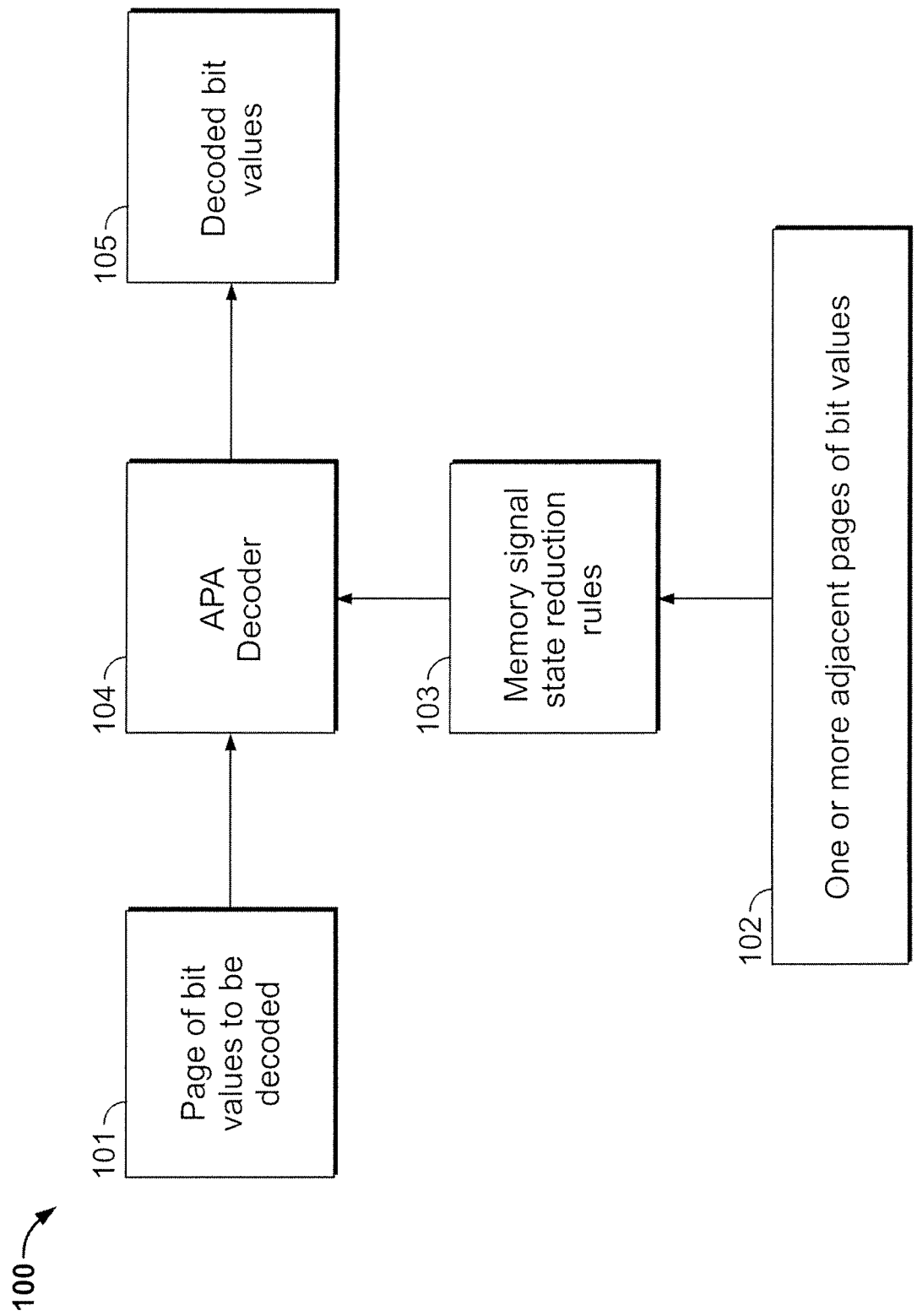
FIG. 1 is high-level block diagram of a decoding apparatus that uses bit values from an adjacent memory page to decode a current page, in accordance with implementations of the subject matter of this disclosure.

In some memory devices, a plurality of bits with respective bit values is encoded in a single multi-level memory cell in which bit values are represented by two or more charge levels. The encoding of a plurality of bit values in the single multi-level memory cell may correspond to a relative signal magnitude—e.g., a charge level—stored in the cell. As a representative example, a single tri-level-cell NAND device holds three bits. Therefore, the tri-level-cell NAND device may contain one of eight data values, each value being encoded by a three-bit string. Each respective bit in the string occupies a respective position of significance in the string—e.g., a three-bit string includes a most significant bit, a center significant bit, and a least significant bit.

Rather than storing values in the memory device according to a binary representation of an ordered sequence of whole numbers (i.e., {0, 1, 2, 3, . . . } as defined in ISO-800000-2), in a multi-level cell, stored values may be ordered according to a Gray code in which each successive value is represented by a bit string that differs from the previous value by a change of a single bit. For example, in a Gray code, '000' may be followed by '010', even though that would correspond to a base-10 value of '0' being followed by a base-10 value of '2'.

A Gray code may be used, in place of the ordered sequence of whole numbers, for the levels of a multi-level cell, to reduce decoding errors. Because only one bit can change between two adjacent values, if a decoded value differs from an adjacent value in more than one bit position, it is known to be an error. For an error in decoding Gray-coded numbers to escape detection, there would have to be an error in more than one bit position, which is less likely than an error in only one bit position. Depending on the number of bits in each string (proportional to the number of levels in each memory cell), there may be only one possible mapping between the ordered sequence of whole numbers and the Gray code representation (for a smaller number of bits), or multiple mappings may be possible (for a larger number of bits).

Data in a memory device may be organized into "pages," where each page includes a plurality of bits in a corresponding respective position of significance across a plurality of memory cells. The position of significance of a bit corresponds to a specific position (i.e., first, last, or a specific position in between) within a bit string containing the bit. Thus, a memory device including an array of tri-level-memory cells may include three types of memory pages—a page including all the most-significant bits in the device, a page including all the center-significant bits in the device, and a page including all the least-significant bits of the device.

Errors in decoding a memory cell may occur as the magnitude of the signal stored in the memory cell becomes closer to one of the threshold voltages against which the possible cell signal levels are compared during decoding. The possibility of decoding failure is further exacerbated by drifting of the signal magnitude stored in the memory cell, which may occur due to process, voltage, or temperature variation, or device aging.

A decoding failure may be determined using a low-density parity-check code, in which decoded bit values may be checked against a prescribed criteria indicating a decoding success. Upon using a low-density parity-check code to verify a memory decoding operation, a number of unsatisfied parity checks—i.e., a syndrome weight—may quantify a rate of failure or a degree of accuracy of the memory decoding operation.

In the possible event of a decoding failure, techniques exist for subsequently recovering bit values. A first technique may be a read-retry process, in which reference threshold voltages may be modified (e.g., according to a prescribed list of values in a read-retry table) and hard information (e.g., bit values are determined by comparing a signal magnitude stored in a memory cell to one or more reference threshold voltages, in view of a Gray-code mapping) may be reported. A second technique may be a deep retry process, in which reference threshold voltages may be modified (e.g., according to a prescribed list of soft read settings) and soft information (e.g., a bit value and a corresponding probability that that bit value had been successfully decoded) may be reported. Either of these two techniques, or other related techniques, may be invoked in response to a low-density parity-check code returning a nonzero syndrome weight, or in response to a similar result indicative of a decoding failure. These and any other data recovery techniques may be used sequentially and/or in combination upon detection of a decoding failure.

Soft information, as mentioned above, may be reported as a log likelihood ratio (LLR), which may be defined as the relationship between the probability (P0) of a bit being '0' and the probability (P1) of a bit being '1':

$$LLR = L = \log\left(\frac{P_1}{P_0}\right)$$

$$P_1 + P_0 = 1$$

$$P_0 = \frac{1}{(1+e^L)}$$

$$P_1 = \frac{e^L}{(1+e^L)}$$

Such LLR values may be provided in LLR tables, which may be a collection of sets of LLRs if varying values and symmetries that may be used to during deep retry operations. LLR tables may be predetermined (e.g., provided by a vendor). Alternatively, the LLR values may be calculated.

Successful memory decoding, during initial memory operations and during post-failure recovery operations, significantly affects the performance of memory devices. For example, decoding failures and ensuing recovering techniques consume extra processing time and add latency to memory operations. In severe cases, decoding failures may render stored data corrupted and/or unretrievable.

In accordance with implementations of the subject matter of this disclosure, in memory devices where memory decoding is performed in a page-wise manner, memory decoding may be improved—thereby contributing to memory device reliability, speed, and performance—by using bits from an "adjacent page" to assist in the decoding of a current page. Bits of the adjacent page (or pages) can correspond to any position of significance in a bit string, provided that the one or more positions of significance of the bits of the one or more adjacent pages are different from the position of significance of the bits being decoded in the given operation (i.e., an "adjacent" page may correspond to bits with a position of significance directly next to the position of significance of the bits being decoded, or the "adjacent" page may correspond to bits with a position of significance more than one position away from the position of significance of the bits being decoded). Knowing the values in the adjacent page means knowing at least one other bit within each of the multi-level cells encoding each entry of the current page being decoded, which reduces the number of possible values of the entry, and therefore limits the possible value, in that current entry, of the bit that belongs to the current page (i.e., of the current bit).

As a result, if comparison of the voltage level of the current entry to the threshold voltages representing different encoded values yields uncertainty as per corresponding to two or more possible values, knowing one of the other bits from an adjacent page will reduce the number of possible values. For example, while decoding the page of center significant bits for a tri-level device, if reading the voltage levels results in an uncertain determination for one entry as being either '010' or '011', but it is known from an adjacent page that the least significant bit is a '1', then the choice of '010' may be eliminated. Similarly, if it is known that the least significant bit is a '1' and the '011' entry corresponds to a high-reliability decoding of the center bit (based on a Gray-code mapping), then the confidence of center bit decoding (as a '1') is improved. Thus, the decoding performance improves because a greater number of errors will be reliably corrected. Implementations of the subject matter of this disclosure may be used with either the ordered sequence of whole numbers representation or Gray-coded representations. However, for reasons discussed above, Gray-coded representations further improve the chances of making the correct choice.

In some implementations of the subject matter of this disclosure, one or more adjacent pages may be used in an initial attempt to decode a current page of bits. However, in cases where typical decoding is sufficiently reliable, the use of an adjacent page may introduce extra operations and therefore may add latency. Therefore, in other implementations of the subject matter of this disclosure, one or more adjacent pages may be used to expedite the execution of recovery techniques, including those mentioned above, only following cases of decoding failure. For example, one or more adjacent pages may be used in a read-retry process or a deep retry process to recover bit values after a decoding failure. One or more adjacent pages may similarly be used to report hard or soft information for the bit values being decoded.

In some other implementations of the subject matter of this disclosure, one or more adjacent pages may be used in a read-retry or deep retry process after a configurable delay—i.e., after decoding without the assistance of an adjacent page has failed a certain threshold number of times or failed with an accuracy below a certain threshold accuracy (e.g., as quantified by a syndrome weight or an LLR). In such delayed adjacent-page-assisted decoding techniques, implementation may configured to optimize decoding with respect to a tradeoff between speed and reliability.

The subject matter of this disclosure may be better understood by reference to FIGS. 1-13.

FIG. 1 depicts how adjacent-page bit values are utilized in a memory decoding operation. Inputs to the decoding architecture 100 include a page 101 of bit values to be decoded and one or more adjacent pages 102 of bit values, different from the page 101 of bit values to be decoded. Each page 101, 102 of bit values includes a plurality of bits from a plurality of multi-level cells. All of the bits in a single page 101, 102 come from a respective identical position of significance (i.e., first, last, or a specific position in between) within bit strings encoded by each multi-level cell, with the bit values in each adjacent page 102 of bit values coming from bit positions that may be one or more positions away from the significance of the bit values in the page 101 of bit values to be decoded.

The page 101 of bit values to be decoded, and the one or more adjacent pages 102 of bit values are input to an adjacent-page-assisted (APA) decoder 104, which uses the bit values in adjacent one or more pages 102 of bit values to determine, in accordance with a set of memory signal state reduction rules 103, a subset of possible values, less than a full set of possible values, that may be contained in the page of bits values to decode 101. The subset of possible values may depend on a Gray-code mapping, a significance of the bit values to decode, a significance of the adjacent-page bit values, a number of adjacent pages, read-reference threshold voltages, and other factors, as is further described below. The APA decoder then compares read-reference threshold voltages to each signal level in each multi-level cell, and determines decoded bit values 105 corresponding to the page 101 of bit values to be decoded, in view of the subset of possible values determined using the memory signal state reduction rules 103 in view of the one or more adjacent pages 102 of bit values.

In some implementations, the APA decoder 104 reports "hard" information—e.g., binary values for each bit in the page 101 of bit values to be decodes. In other implementations, the APA decoder 104 reports "soft" information—e.g., a probability that a given bit is a '0' or a '1'. The APA decoder 104 may be used in an initial decoding attempt, or it may be used after a decoding failure, as described above and as further described below.

The APA decoder 104 may evaluate the page 101 of bit values to decode independently of the correctness of bits in the one or more adjacent pages 102 of bit values. It has been observed empirically that using APA decoder 104 with adjacent pages 102 including some incorrect bit values may nonetheless improve the decoding of page 101 of bit values to be decoded.

Figure 2:
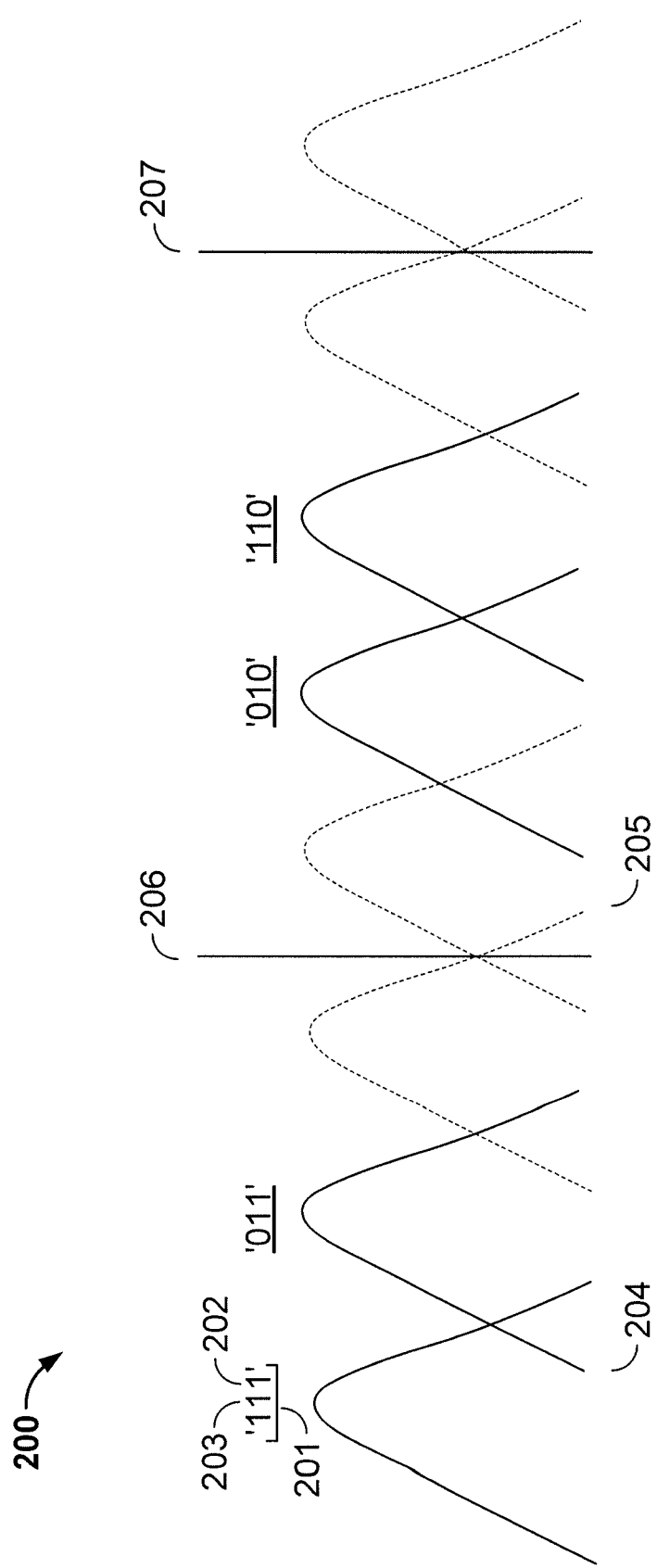
FIG. 2 is a graphical representation of how adjacent-page-assisted decoding may be applied, in accordance with implementations of the subject matter of this disclosure.

FIG. 2 shows the application, according to implementations of the subject matter of this disclosure, of memory signal state reduction rules 103, using one adjacent page 102, to a representative distribution 200 of memory cell charge levels in a multi-level cell, for APA decoding of a page representing center bits. A current bit string 201 is stored in a multi-level cell and includes a bit to be decoded 202 and an adjacent-page bit 203. While FIG. 2 shows the current bit string 201 with the bit to be decoded 202 having a last position of significance and the adjacent-page bit 203 having a center position of significance, the memory signal state reduction rules 103 may be applied to any bit string longer than one bit, and the respective positions of significance of the bit to be decoded and the one or more adjacent-page bits can be any respective position, provided that no two of these bits have the same position of significance.

According to an implementation of the subject matter of this disclosure, FIG. 2 shows certain examples of how the APA decoder 104 improves memory decoding using a single adjacent page. Based on the adjacent-page bit value 203—provided as a '1' in this example—and the memory signal state reduction rules 103, a set of possible charge stages 205—i.e., the charge states indicated by broken lines—are eliminated, reducing the possible charge states of a multi-level cell encoding the current bit string 201 to the set of charge states 204—i.e., the charge states indicated by solid lines. Thus, a memory signal state reduction has occurred. In this three-bit example, with eight possible signal levels of the multi-level cell, four of eight of the possible signal levels are removed from consideration during memory decoding. The number of eliminated charge states 205 will depend on the significance and the value of the adjacent-page bit 203, as well as a quantity of adjacent-page bits being considered and a length of the current bit string 201.

FIG. 2 further depicts the interplay of memory signal state reduction rules 103, bit values, and the reference voltage levels 206 and 207 used by APA decoder 104. APA decoder 104 may use reference voltage levels to determine bit values according to whether a relative signal level (which encodes a respective set of bit values) stored in a multi-level cell is greater or less than one or more of the reference voltage levels. In this case, after the elimination of charge states 205, none of the remaining charge states 204 are contiguous to reference voltage levels 206 and 207. As a result, the probability of a failed or uncertain decoding (e.g., resulting from a charge state falling ambiguously relative to a reference voltage level and confusing the greater-than/less-than comparison) is reduced. The elimination of some of the charge states, such as charge states 205, may enable decoding using a subset of the reference voltage levels—e.g., removing any need for comparison against reference voltage level 207 and allowing the value of the bit 202 to be decoded to be determined solely by comparison against reference voltage level 206.

Figure 3:
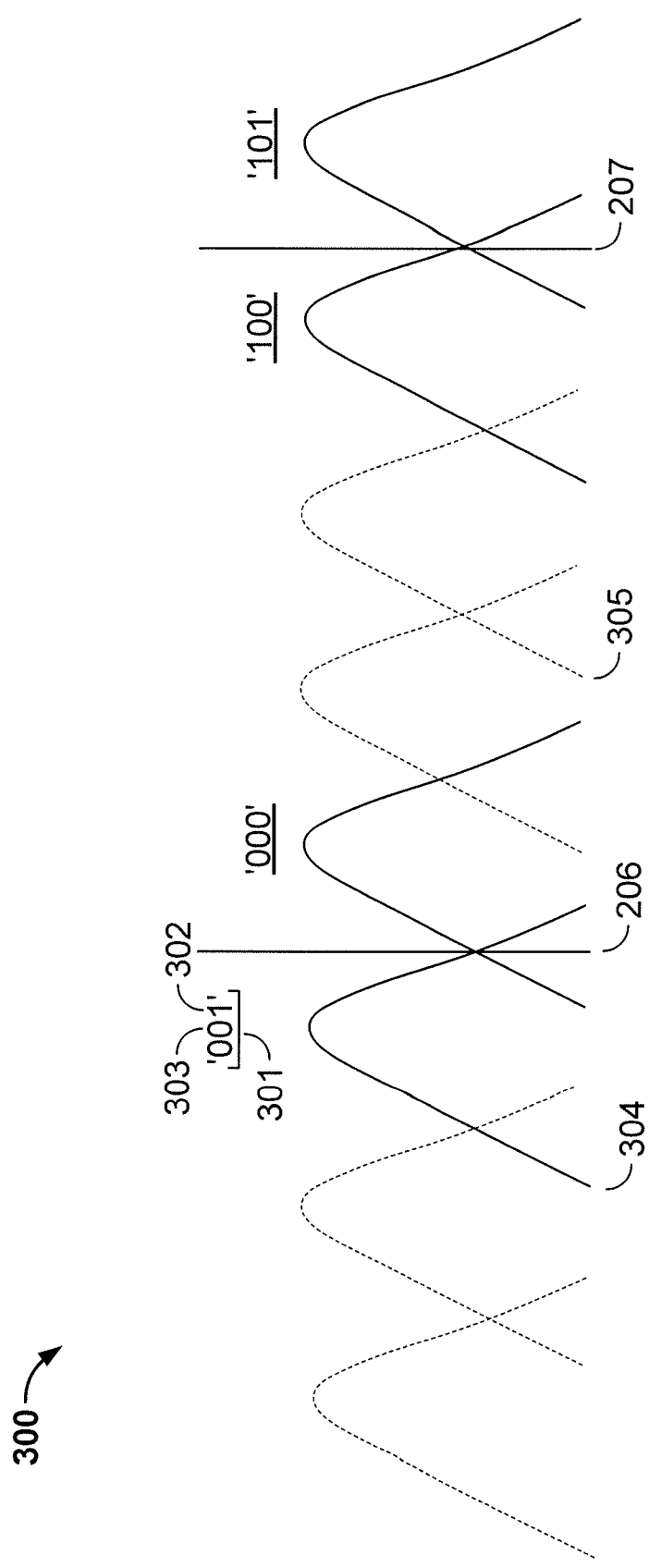
FIG. 3 is a second graphical representation of how adjacent-page-assisted decoding may be applied, in accordance with implementations of the subject matter of this disclosure.

FIG. 3 shows a second representative distribution 300 of memory cell charge levels in a multi-level cell for APA decoding of a page representing center bits. A current bit string 301 includes a bit to be decoded 302 and an adjacent-page bit 303. Compared to FIG. 2, the value of the adjacent-page bit 303 in FIG. 3 switches from a '1' to a '0', and the resulting effects on APA decoding are shown. Due to the new value of the adjacent-page bit 303, new sets of possible charge states 305 are eliminated, reducing the possible charge states of a multi-level cell encoding the current bit string 301 to the set of charge states 304.

Given a set of conditions as shown in distribution 300 for implementing the memory signal state reduction rules 103, including a Gray-code mapping, reference voltage levels 206 and 207, a bit string length, a significance of the bit to be decoded 302, and a value and significance of the adjacent-page bit 303, the APA decoder 104 may not improve the outcome of this specific operation. A lack of operational improvement may occur in some instances when all the charge states 304 that have not been eliminated happen to be charge states that are all contiguous to the relevant reference voltage levels (e.g., 206 and 207). In some implementations of this disclosure, during single-page APA decoding, the APA decoder 104 may apply contextual information (e.g., a bit string length, values and significances of adjacent-page bit values, significance of a bit value to be decoded, a Gray-code mapping, and/or a set of reference voltage levels) to use a specific page 102 of bit values that limits or eliminates occurrence of a lack of operational improvement during APA decoding.

Figure 4:
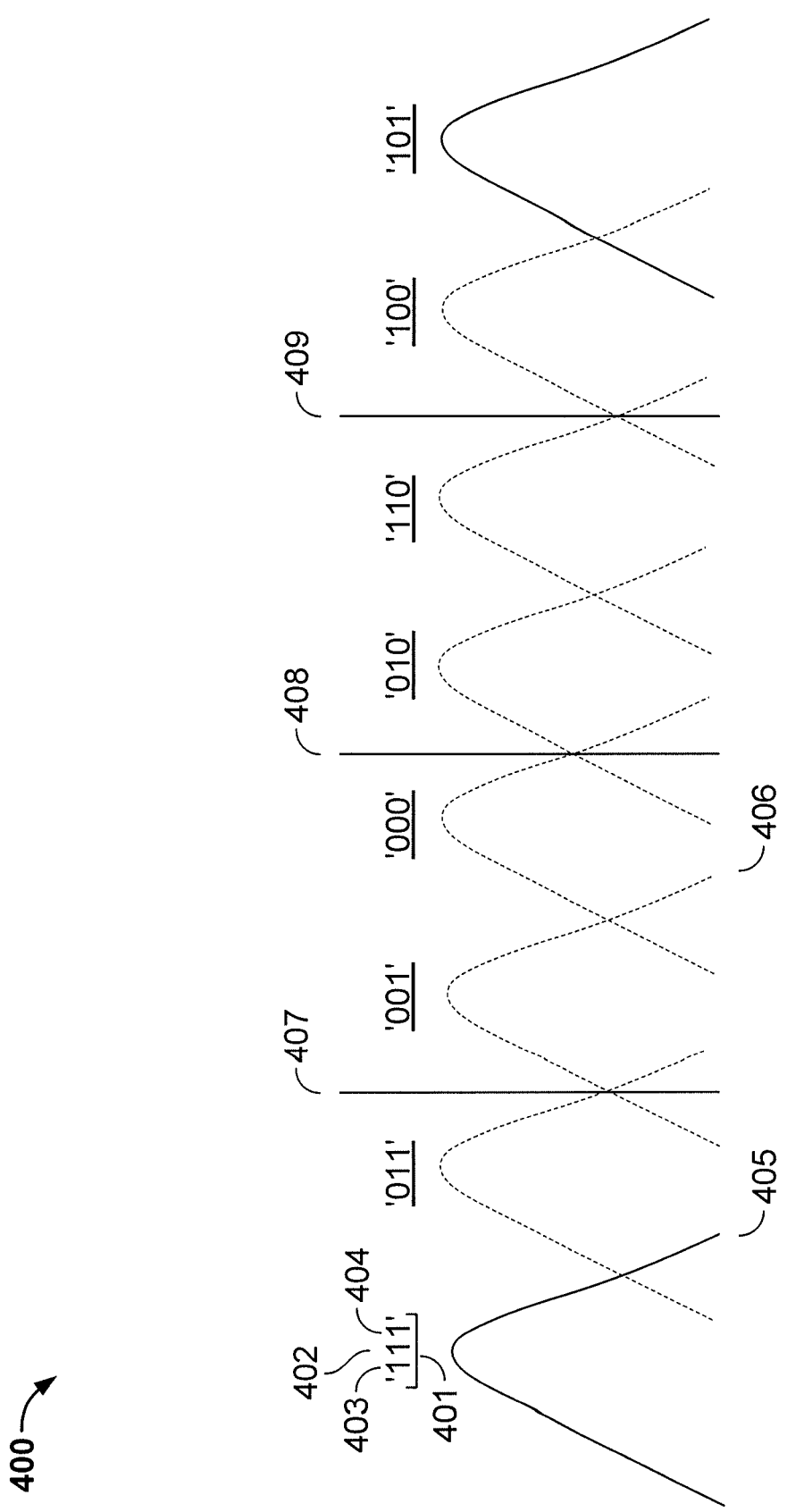
FIG. 4 is a third graphical representation of how adjacent-page-assisted decoding may be applied, in accordance with implementations of the subject matter of this disclosure.

FIG. 4 shows the application, according to implementations of the subject matter of this disclosure, of memory signal state reduction rules 103, using two adjacent pages 102, to a representative distribution 400 of memory cell charge levels in a multi-level cell, for APA decoding of a page representing center bits. A current bit string 401 is stored in a multi-level cell and includes a bit to be decoded 402, a first adjacent-page bit 403, and a second adjacent-page bit 404. While FIG. 4 shows the current bit string 401 with the bit to be decoded 402 having a center position of significance, the first adjacent-page bit 403 having a first position of significance, and the second adjacent-page bit 404 having a last position of significance, the respective positions of significance of the bit to be decoded and the one or more adjacent-page bits can be any respective position, provided that no two of these bits have the same position of significance. In the representative distribution 400, all bits of the current bit string 401 are considered; upon extending this memory signal state reduction rules 103 to a bit string of length greater than three bits, any two or more adjacent-page bits, different from a bit to decode, may be considered.

According to an implementation of the subject matter of this disclosure, FIG. 4 shows certain examples of how the APA decoder 104 improves memory decoding using multiple adjacent pages. Based on the first and second adjacent-page bit values 403 and 404 (both provided as a '1' in this example), possible charge states 406 (the charge states indicated by broken lines) are eliminated, reducing the possible charge states of a multi-level cell encoding the current bit string 401 to the set of charge states 405 (the charge states indicated by solid lines)—i.e., a memory signal state reduction has occurred. In this three-bit example, with eight possible signal levels of the multi-level cell, six of eight of the possible signal levels are removed from consideration during memory decoding. In this case, after the elimination of charge states 406, none of the remaining charge states 405 are contiguous to reference voltage levels 407, 408, or 409. As a result, the probability of a failed or uncertain decoding (e.g., resulting from a charge state falling ambiguously relative to a reference voltage level, confusing the greater-than/less-than comparison) is reduced. The elimination of some of the charge states, such as charge states 406, may enable decoding using a subset of the reference voltage levels—e.g., allowing the value of the bit 402 to be decoded to be determined by comparison against a subset of reference voltage levels 407, 408, and 409. For example, in the situation depicted in FIG. 4, comparison against any single one of reference voltage levels 407, 408 and 409 would be sufficient to determine the bit value, although in other situations a comparison against two, or all three, of the levels may be necessary.

Figure 5:
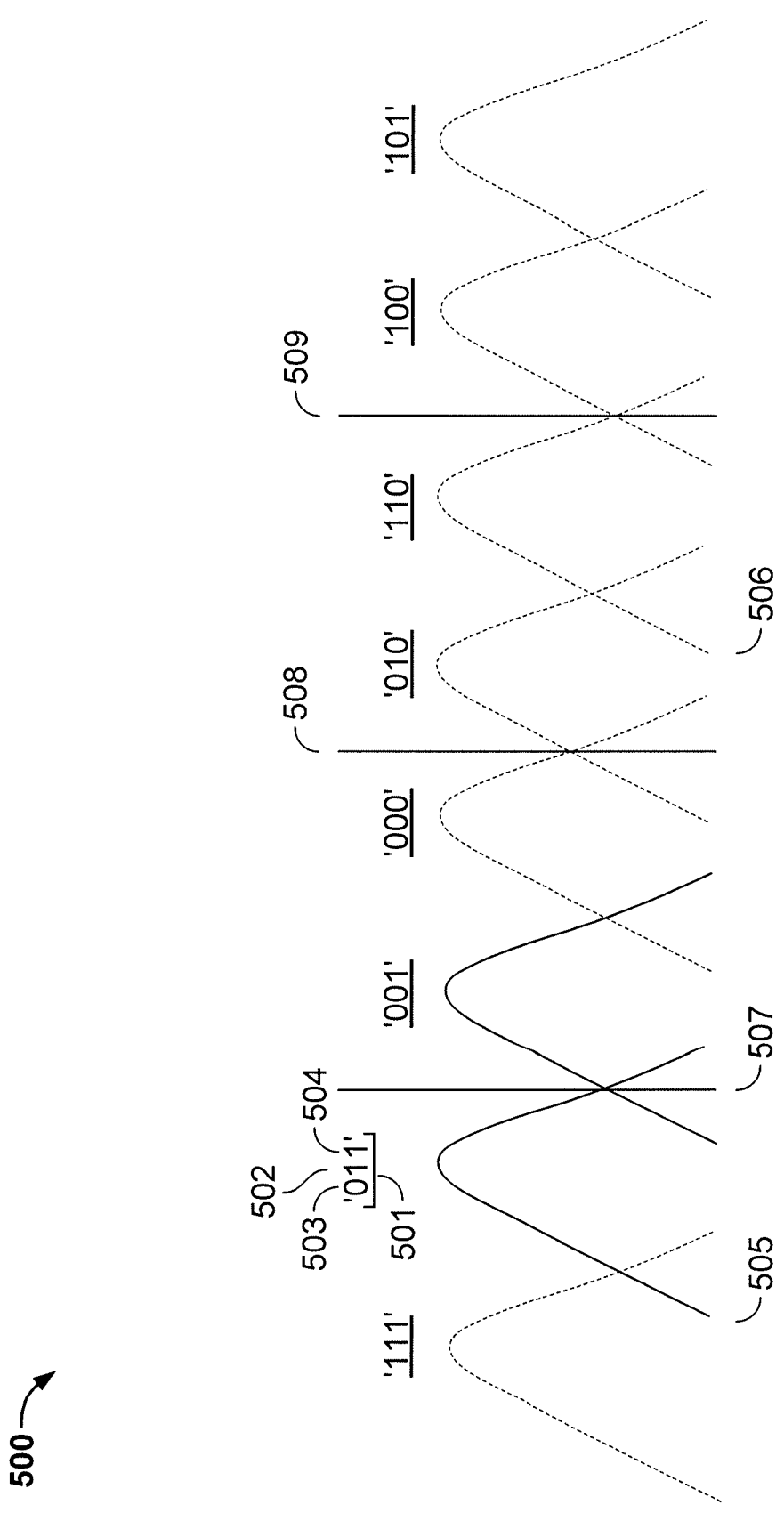
FIG. 5 is a fourth graphical representation of how adjacent-page-assisted decoding may be applied, in accordance with implementations of the subject matter of this disclosure.

To further describe various implementations of the subject matter of this disclosure, FIG. 5 shows a second representative distribution 500 of memory cell charge levels in a multi-level cell for APA decoding of a page representing center bits. A current bit string 501 includes a bit to be decoded 502, a first adjacent-page bit 503, and a second adjacent-page bit 504. Compared to FIG. 4, the first adjacent-page bit value in FIG. 5 switches from a '1' to a '0', the second adjacent-page bit value remains at a '1', and the resulting effects on APA decoding are shown. Due to the new value of the first adjacent-page bit 503, a new set of possible charge states 506 is eliminated, reducing the charge states of a multi-level cell encoding the current bit string 501 to the set of charge states 505.

Given a set of conditions as shown in distribution 500 for implementing the memory signal state reduction rules 103, including a Gray-code mapping, reference voltage levels 507, 508, and 509, a bit string length, a significance of the bit to decode 502, a value and significance of the first adjacent-page bit 503, and a value and significance of the second adjacent-page bit 504, the APA decoder 104 may not improve the outcome of this specific operation, again due to depicting one of few instances where all the possible charge states 505 happen to be charge states that are contiguous to a relevant reference voltage level (e.g., 507). In some implementations of this disclosure, during multiple page APA decoding, the APA decoder 104 may apply contextual information (e.g., a bit string length, values and significances of adjacent-page bit values, significance of a bit value to be decoded, a Gray-code mapping, and a set of reference voltage levels) to use a specific plurality of pages 102 of bit values that limits or eliminates occurrence of the lack of operational improvement during APA decoding.

In the implementations described so far, the APA decoder 104 can be used in many memory operations including, but not limited to, initial memory decoding, memory decoding following a decoding failure, memory decoding using hard information, memory decoding using soft information, read-retry memory decoding, deep retry memory decoding, or any combination thereof. In the following, representative implementations of the APA decoder 104 are provided, including implementations for executing the abovementioned operations.

Figure 6:
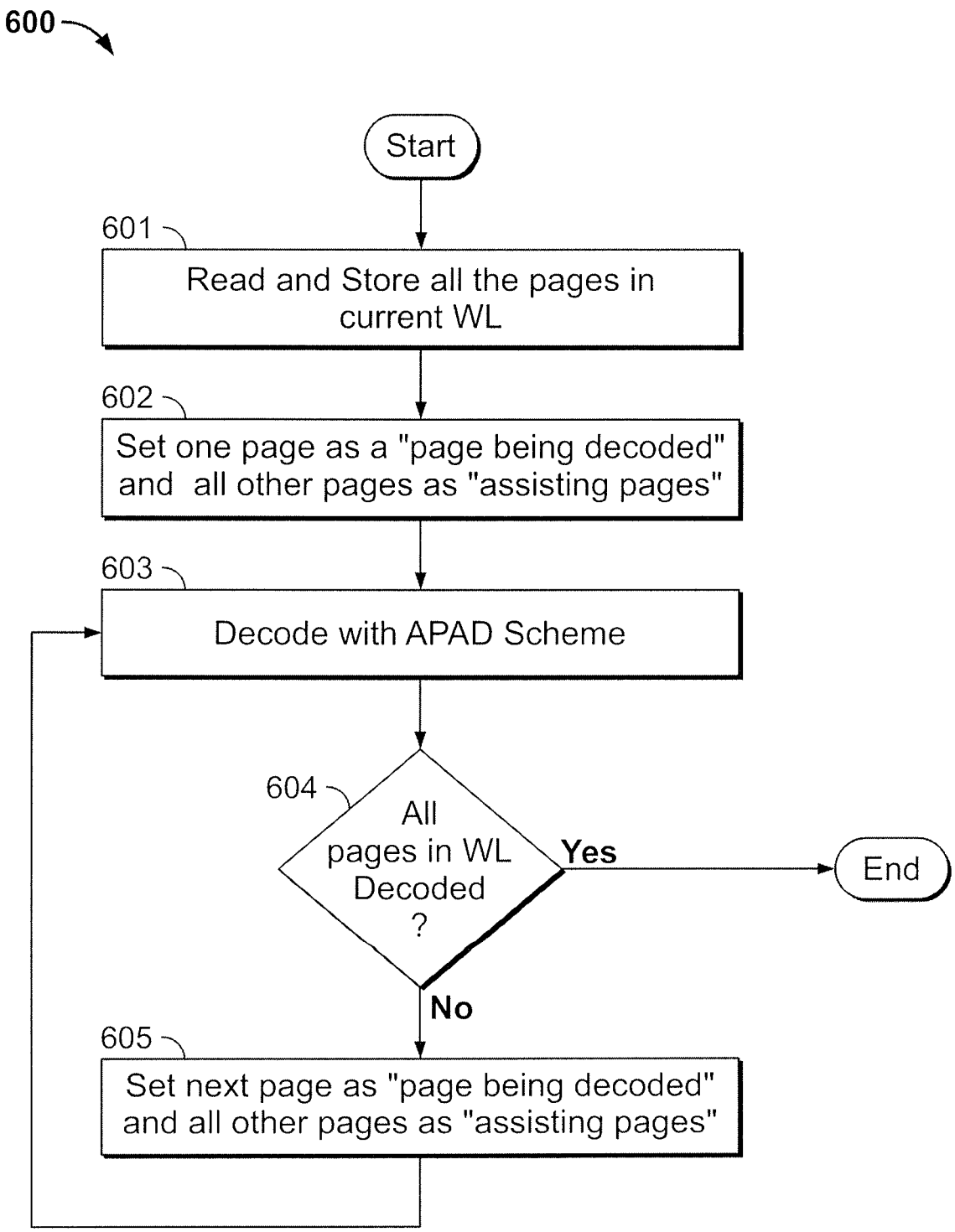
FIG. 6 is a flow diagram of a method for utilization of adjacent-page bit values during memory decoding according to a first implementation of the subject matter of this disclosure.

FIG. 6 is a flow diagram of a streaming mode implementation 600 of an APA decoder. In this implementation, the APA decoder may perform an initial memory decoding operation. According to this implementation of the subject matter of this disclosure, process 600 begins a memory decoding operation at 601, where an APA decoder reads and stores all pages in a current wordline (WL). At 602, one page is set as a "page being decoded" and all other pages are set as "assisting pages." At 603, the page being decoded is decoded using an adjacent-page-assisted decoding (APAD) scheme. At 604, it is determined whether all pages in the wordline have been decoded. If all the pages have been decoded, process 600 ends at 604. However, if it determined at 604 that all the pages in the wordline have not been decoded, process 600 proceeds to 605. At 605, one new page, different from the page set as the page being decoded at 602, is set as the page being decoded and all other pages, including the page that was previously set as the page being decoded at 602, are set as assisting pages. From 605, process 600 returns to 603 and decodes the newly assigned page being decoded. Steps 603, 604, and 605 are iteratively repeated, with a new and yet-to-be decoded page assigned as the page being decoded in each iteration, and all other pages assigned as the assisting pages in each iteration, until all the pages in the wordline have been decoded.

Figure 7:
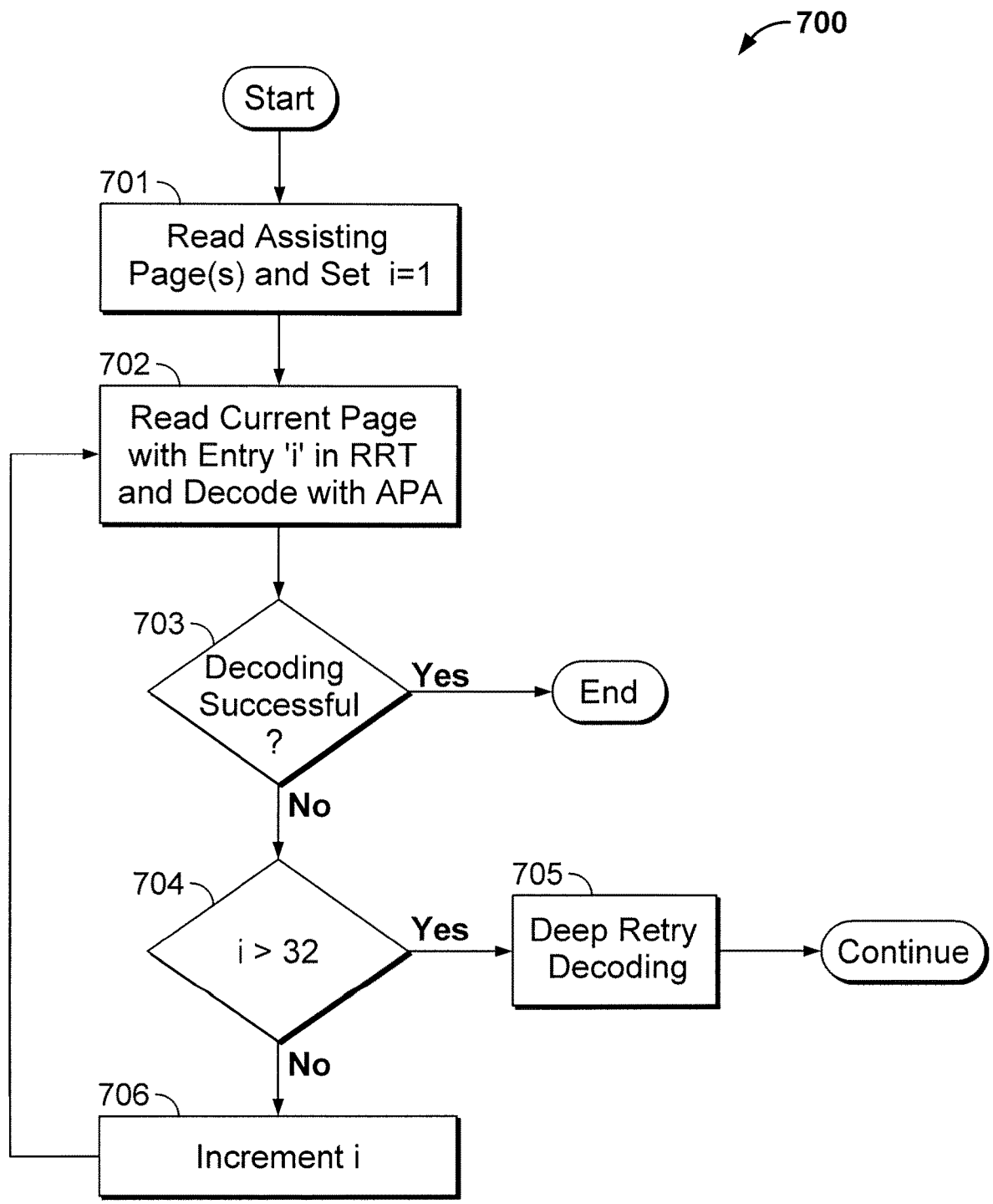
FIG. 7 is a flow diagram of a method for utilization of adjacent-page bit values during memory decoding according to a second implementation of the subject matter of this disclosure.

FIG. 7 is a flow diagram of a read-retry mode implementation 700 of an APA decoder. In this implementation, the APA decoder may perform a memory decoding operation upon a decoding failure with default reference threshold voltages, and may then incorporate modified reference threshold voltages according to reference threshold voltages provided in a read-retry table (RRT). According to this implementation of the subject matter of this disclosure, process 700 inherits from the decoding failure a page being decoded. Thus, process 700 begins at 701 by reading one or more assisting page and setting an incremental counter 'i'=1. At 702, the page being decoded is read by comparison with the reference threshold voltages of RRT entry 'i', and uses one or more adjacent pages to decode the page being decoded. At 703, it is determined whether APA decoding has been successful. If the decoding has been successful, process 700 ends at 703. However, if at 703 it is determined that the decoding has not been successful, then at 704 it is determined whether 'i' exceeds a maximum value that may correspond to a final entry in the RRT (e.g., 'i'>32). If 'i' has exceeded the maximum value, process 700 ends at 705, whereupon the decoding has failed in read-retry mode and therefore proceeds to decoding in deep retry mode. However, if at 704 it is determined that 'i' has not exceed the maximum value, 'i' is incremented by one number and process 700 returns to 702.

Steps 702, 703, 704, and 706 are iteratively repeated, with successive entries in the RRT and corresponding reference threshold voltages being used according to a current value of 'i', until decoding is successful or all the values of the RRT have been exhausted.

Figure 8:
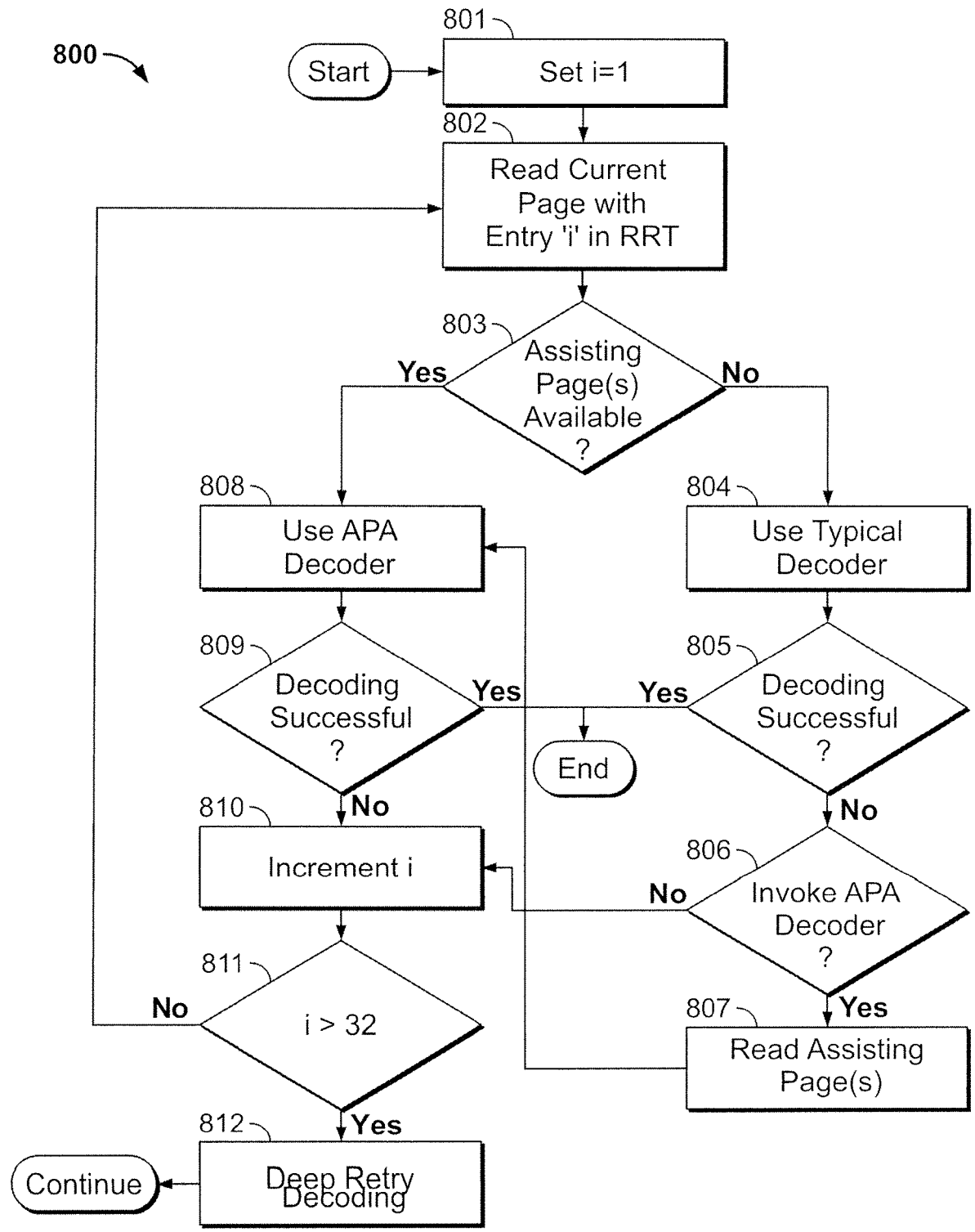
FIG. 8 is a flow diagram of a method for utilization of adjacent-page bit values during memory decoding according to a third implementation of the subject matter of this disclosure.

FIG. 8 is a flow diagram of a delayed read-retry mode implementation 800 of an APA decoder. In this implementation, the APA decoder may include implementation 700 and further include a configurable delay mechanism, the delay mechanism switching operation from a typical memory decoder (i.e., a decoder not considering adjacent-page bit values) to the APA decoder after a configurable criterion has been met. In some implementations, the delayed APA decoder is used to improve an overall speed of a memory architecture due to avoiding extra operations as incurred during APA memory decoding when typical decoding demonstrates a sufficiently high probability of success. As in FIG. 7, process 800 inherits from a decoding failure a page being decoded. Thus, process 800 begins at 801 by setting an incremental counter 'i'=1 and proceeds at 802 to read the page being decoded with RRT entry 'i'. At 803, it is determined whether one or more assisting pages are available. If it is determined that no assisting pages are available, then at 804 a typical decoder is used. Then, it is determined at 805 whether the typical decoder was successful. If it is determined at 805 that the decoding was successful, process 800 ends and the APA decoder is bypassed to prevent incurring extra operations during decoding.

However, if it is determined at step 805 that the typical decoder was not successful, it is then at 806 determined whether to invoke the APA decoder. Whether to invoke the APA decoder may depend on a threshold number of failed decoding operations, as further described below. If the APA decoder is invoked at 806, then at 807 one or more assisting pages are read. At 808, the APA decoder is used for decoding, and at 809, it is determined whether the APA decoder was successful. If it is determined at 809 that the APA decoding was successful, process 800 ends and the APA decoder has executed successful decoding after the typical decoder failed. However, if process 800 determines at step 809 that the decoding was not successful, at 810 'i' is incremented by one number and at 811 it is determined whether 'i' exceeds a maximum value that may correspond to a final entry in the RRT (e.g., 'i'>32). If 'i' has exceeded the maximum value, process 800 ends at 812, whereupon the decoding has failed in read-retry mode and therefore proceeds to decoding in deep retry mode. However, if it is determined that 'i' has not exceed the maximum value, process 800 returns to 802 and iteratively repeats the subsequent steps until decoding is successful or all values in the RRT table have been exhausted.

Returning to 806, in some implementations, it is determined to invoke the APA decoder after a configurable threshold number of failures (e.g., 'i'=5). In such implementations, it is determined at 806 not to invoke the APA decoder until 'i' has exceeded the configurable threshold number of failures. As a result, process 800 continues at 810 to increment 'i' by one number and then proceeds to the subsequent steps beginning at 811. The threshold number of failures (i.e., 'i' value) after which the APA decoder is invoked at 806 may be configured according to contextual information including a bit string length, a number and values of adjacent pages, a Gray-code mapping, a list of RRT entries, and other factors.

Figure 9:
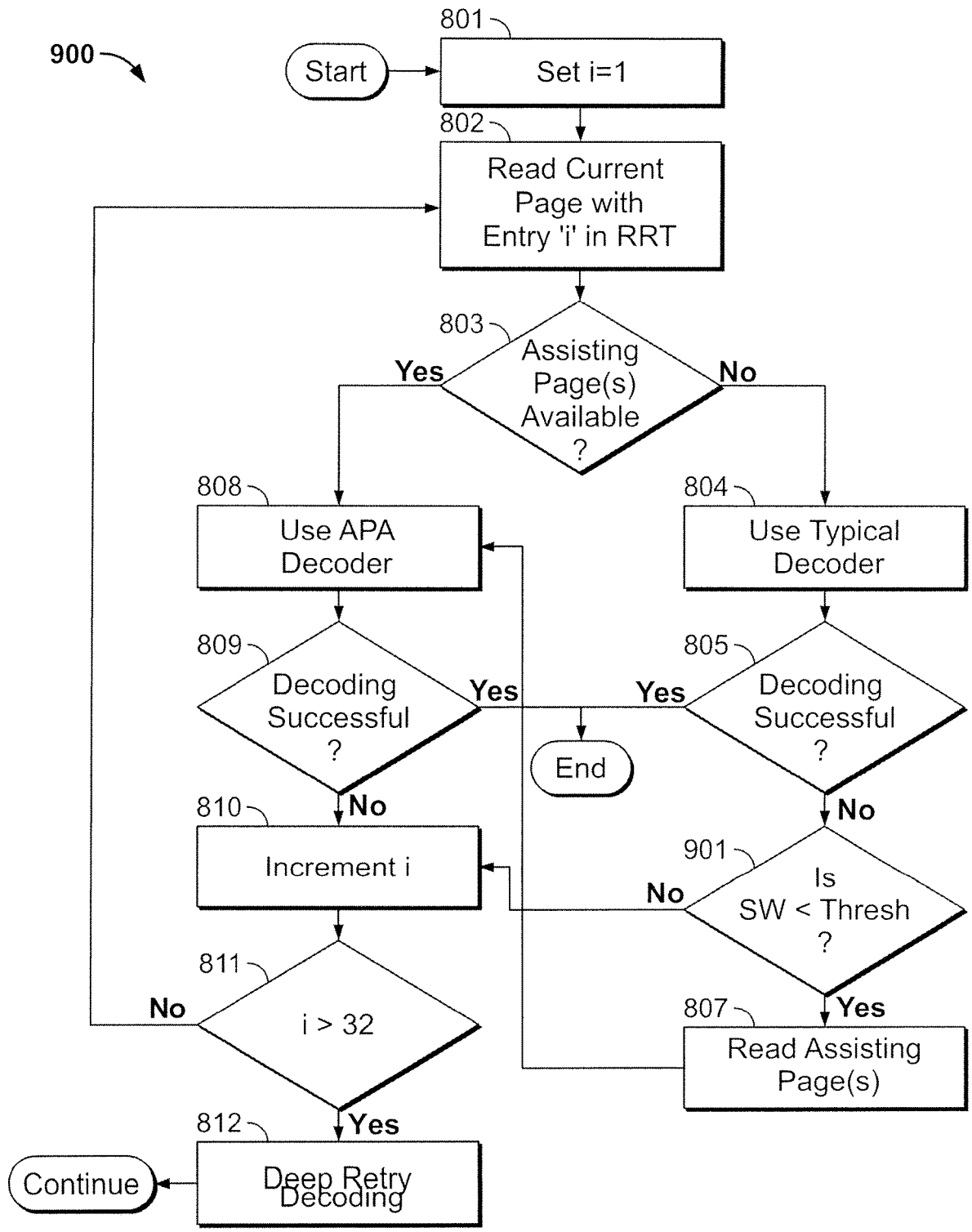
FIG. 9 is a flow diagram of a method for utilization of adjacent-page bit values during memory decoding according to a fourth implementation of the subject matter of this disclosure.

FIG. 9 is a flow diagram of a second delayed read-retry mode implementation 900 of an APA decoder. Compared to implementation 800, implementation 900 differs in its criterion for invoking the APA decoder after some delay.

At 901, the APA decoder is invoked if the syndrome weight (SW) of a decoded string is below a configurable threshold value of the syndrome weight. Because the syndrome weight may quantify data reliability, implementation 900 applies the APA decoder only after a typical decoding operation is below a threshold (Thresh) level of accuracy—e.g., after a decoding is sufficiently inaccurate. The syndrome weight may correspond to a number of unsatisfied parity checks determined upon attempting to verify a decoded bit string value against a low-density parity-check code, or it may correspond to a different technique for quantifying the accuracy of a decoding.

Figure 10:
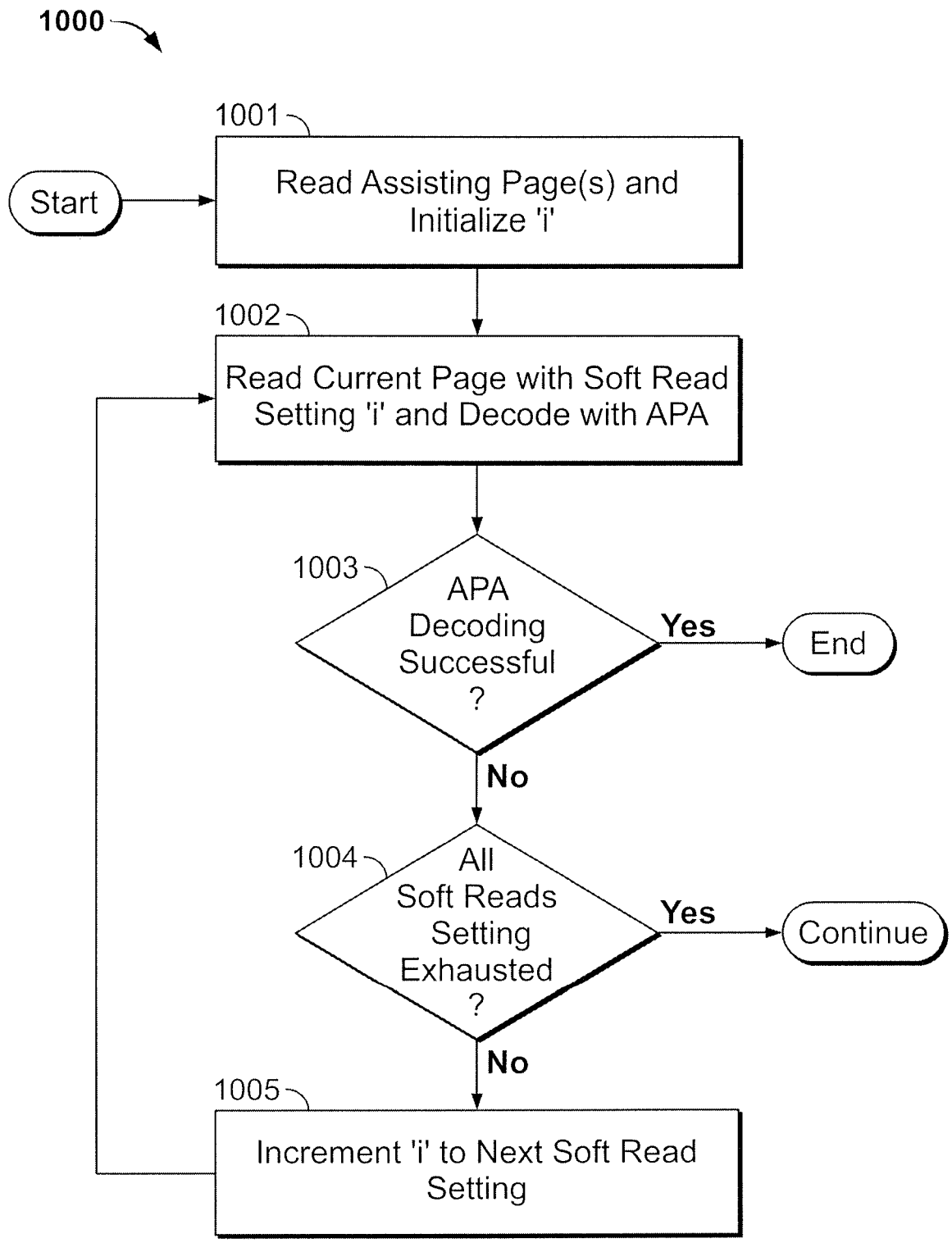
FIG. 10 is a flow diagram of a method for utilization of adjacent-page bit values during memory decoding according to a fifth implementation of the subject matter of this disclosure.

FIG. 10 is a flow diagram of a deep retry mode implementation 1000 of an APA decoder. In some instances, implementation 1000 may follow from the "Continue" endpoint of implementations 700, 800, or 900. Process 1000 begins a deep retry attempt at 1001 by reading one or more assisting page and initializing incremental counter 'i'=1. At 1002, a current page to be decoded is read with soft read setting 'i', and the APA decoder is used to determine bit values based on soft information. Decoding information acquired with a soft read setting, i.e., soft information, may be expressed as a log likelihood ratio (LLR), wherein the LLR value expresses a decoded bit value along with a probability that the decoded bit value has been successfully decoded. At 1003, it is determined whether the APA decoding was successful. If the decoding has been successful, process 1000 ends at 1003. However, if at 1003 it is determined that the decoding has not been successful, then it is further determined at 1004 whether all soft read settings have been exhausted. If all soft read settings have been exhausted, process 1000 ends at 1004. However, if at 1004 it is determined that all soft read settings have not yet been exhausted, then at 1005 'i' is incremented by one number and process 1000 returns to 1002. Steps 1002, 1003, 1004, and 1005 are iteratively repeated, with successive soft read settings applied according to the value of 'i', until decoding is successful or all soft read settings have been exhausted.

In accordance with implementations of the subject matter of this disclosure, an APA decoder can improve a probability that data read from a noisy page has been successfully decoded using soft read information, including when the soft read information is expressed as an LLR value, as described below. In some implementations of the present disclosure, soft information may be categorized as "Weak" or "Strong," in which Weak information may correspond to an LLR magnitude close to 0 and Strong information may correspond to an LLR magnitude close to +100, with LLR ranging from −100 to +100, minimum and maximum LLR values indicating a very high probability that a bit value is a '0' or a '1', and a zero-magnitude LLR indicating that each possible bit value is equally likely.

The following example of how an APA decoder may improve a probability that a decoded bit value has been successfully decoded using soft read information may be better understood with reference to FIG. 2. TABLE 1 shows two adjacent-page bit values, four possible bit read outcomes from a typical decoder for each adjacent-page bit value, and eight corresponding LLR values determined using APA decoding. In TABLE 1, APA decoder-based LLR values are representative of an implementation where one bit is decoded from a three-bit string using one adjacent-page bit. Four possible bit read outcomes from the typical decoder are: "Strong 1," "Weak 1," "Weak 0," and "Strong 0." If the adjacent-page bit value is '1', the APA decoder determines high-probability LLR values (i.e., $LLR_H$) with magnitudes greater than a typical Strong read outcome (i.e., $LLR_M$), despite decoding conditions in which a typical decoder would report Strong and Weak (i.e., $LLR_L$) soft read outcomes. Therefore, the APA decoder improves the Strong and Weak soft read outcomes compared to a typical decoder to realize an improved probability of success. The improved probability of success may be enabled by the memory signal state reduction rules 103 obviating a possibility for a Weak read.

TABLE 1

APA decoder-based LLR values

| Adjacent Page Bit Value | Typical Decoder Bit Reads | APA Decoder Bit Reads, as LLR |
|---|---|---|
| 1 | Strong 1 | $LLR_H$ |
|   | Weak 1 | $LLR_H$ |
|   | Weak 0 | $-LLR_H$ |
|   | Strong 0 | $-LLR_H$ |
| 0 | Strong 1 | $LLR_M$ |
|   | Weak 1 | $LLR_L$ |
|   | Weak 0 | $-LLR_L$ |
|   | Strong 0 | $-LLR_M$ |

Continuing the prior example in a manner that may be better understood with reference to FIG. 3, when the adjacent-page bit value is '0', the APA decoder determines bit read LLR values with moderate (i.e., $LLR_M$) or low (i.e., $LLR_L$) probability, comparable to the output of a typical decoder. As mentioned, these moderate- and low-probability LLR values respectively correspond to Strong and Weak soft read outcomes, with both having lower magnitudes than the high-probability $LLR_H$ value. In this instance, the unimproved LLR results from the memory signal state reduction rules 103 not obviating a possibility for a Weak read. In some implementations of this disclosure, the APA decoder may apply contextual information (e.g., a bit string length, values and significances of adjacent-page bit values, significance of a bit value to be decoded, a Gray-code mapping, and a set of reference voltage levels) to select one or more adjacent pages 102 that limit or eliminate the occurrence of unimproved LRR values.

Figure 11:
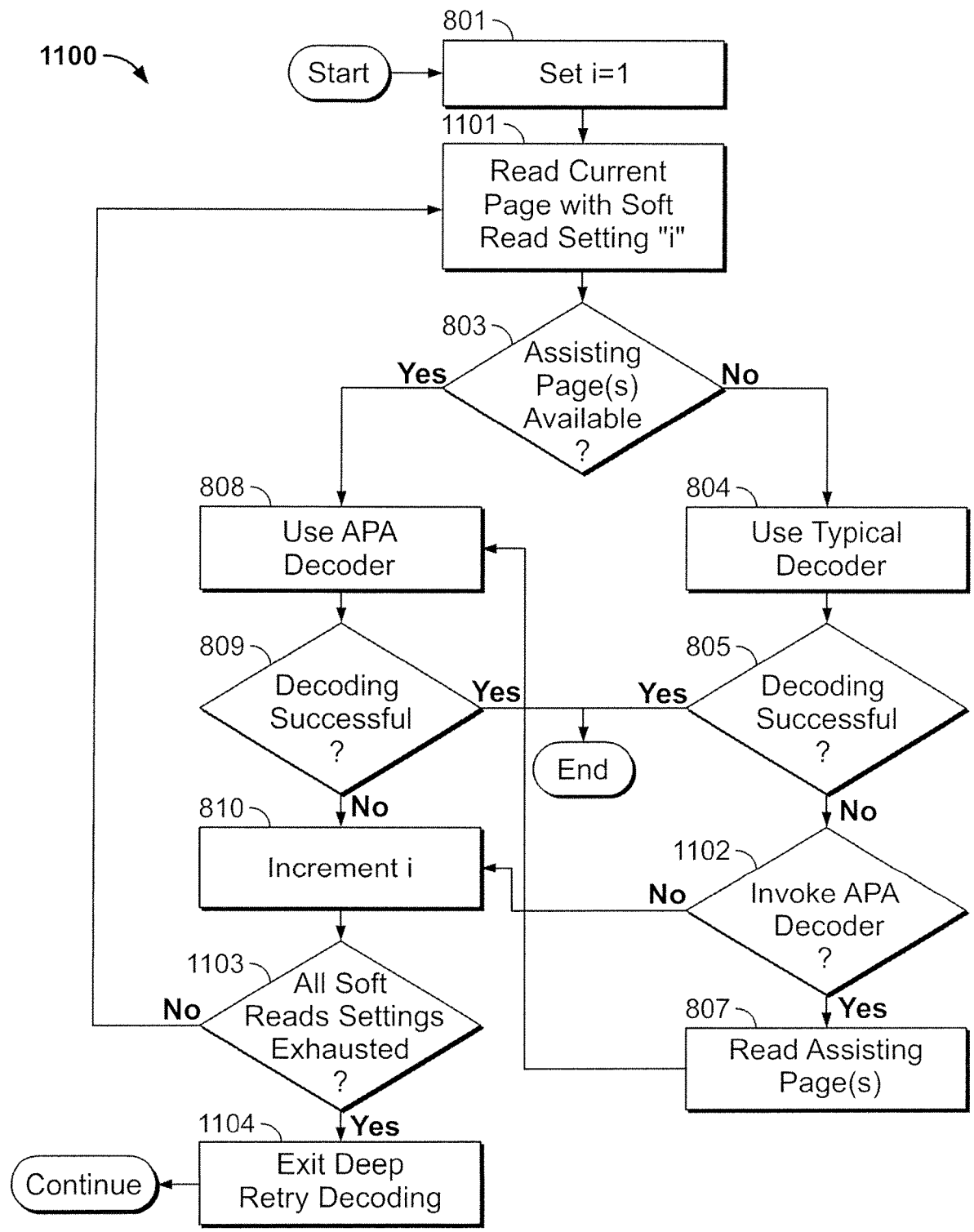
FIG. 11 is a flow diagram of a method for utilization of adjacent-page bit values during memory decoding according to a sixth implementation of the subject matter of this disclosure.
Figure 12:
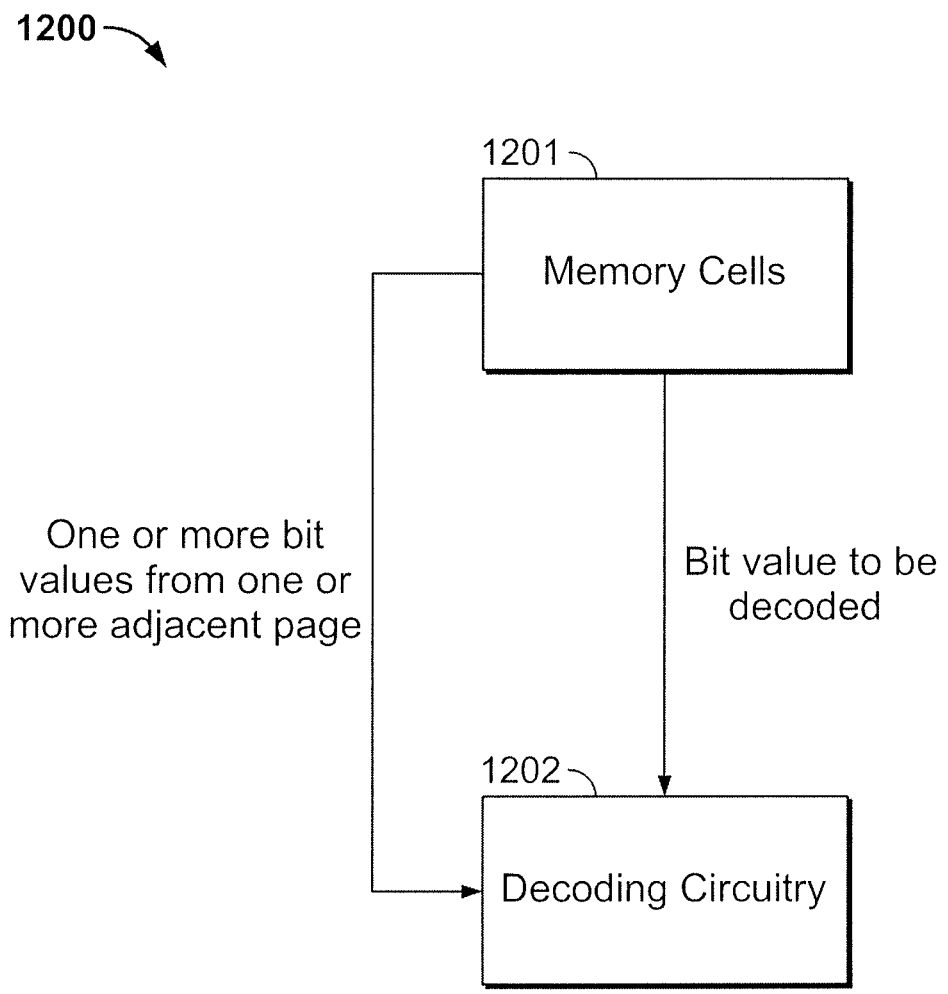
FIG. 12 is a block diagram of a memory decoding device including memory cells and decoding circuitry, in accordance with implementations of the subject matter of this disclosure.
Figure 13:
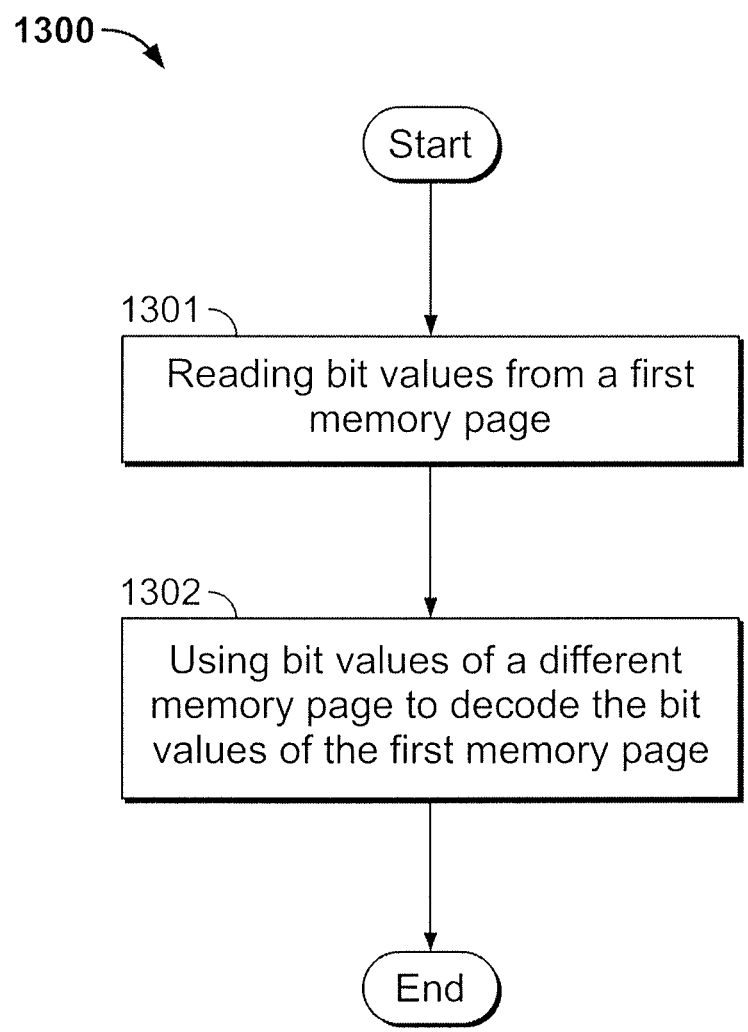
FIG. 13 is a flow diagram of a method for adjacent-page-assisted memory decoding in accordance with implementations of the subject matter of this disclosure.

FIG. 11 is a flow diagram of a delayed deep retry mode implementation 1100 of an APA decoder. In this implementation, the APA decoder may include implementation 1000 and further include a configurable delay mechanism, the delay mechanism switching operation from a typical decoder to the APA decoder after a configurable criterion has been met.

Implementation 1100 follows the procedure of implementation 800, with modifications according to operation in deep retry mode rather than read-retry mode. At 1101, a page being decoded is read with sot read setting 'i', using one of a typical decoder or the APA decoder according to a value of 'i'. In a case of unsuccessful decoding, it is determined at 1102 whether to invoke the APA decoder. While this determination at 1102 is similar to that of 806, a configurable threshold value of 'i' applied at 1102 may differ from that of 806 as per the implementation of soft read settings at 1101. Process 1100 iteratively repeats until a decoding is determined to be successful at 805 or 809, or all soft read settings are determined to be exhausted at 1103. If all soft read settings have been exhausted, process 1100 ends at 1104 by exiting a deep retry decoding mode.

In accordance with the subject matter of this disclosure, including FIGS. 1-11, FIG. 12 is a block diagram of a memory decoding device 1200 including memory cells 1201 and decoding circuitry 1202. Memory cells 1201 include a plurality of multi-level cells storing a plurality of signal levels, which represent a plurality of values corresponding to a respective plurality of bits. These bits are in corresponding respective positions of significance across the plurality of memory cells constituting respective memory pages of the memory device. Decoding circuitry 1202 includes APA decoders configured to decode each bit value of a current memory page to be decoded, using bit values read from at least one other memory pages, adjacent to the current memory page to be decoded.

In accordance with the subject matter of this disclosure, including FIGS. 1-12, FIG. 13 is a method for operating an adjacent-page-assisted memory decoder, such as is shown in the architecture 1200. Method 1300 starts at 1301 with reading bit values from a first memory page. At 1302, bit values of a different memory page are used to decode the bit values of the first memory page. The different memory page may be referred to as an adjacent page, and may include bits located at any position of significance across the plurality of memory cells, provided that the position of significance of the bits of the adjacent page is different from the position of significance of the bit values of the first memory page.

Thus it is seen that an arrangement of memory cells and decoding circuitry that enable adjacent-page-assisted memory decoding, as well as methods for operating the memory cells and decoding circuitry to execute adjacent-page-assisted memory decoding, have been provided.

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. A memory device comprising:
a plurality of memory cells, each memory cell storing one signal level from among a plurality of possible signal levels representing a plurality of values corresponding to a respective plurality of bits, bits in corresponding respective positions of significance across the plurality of memory cells constituting respective memory pages of the memory device; and
decoding circuitry configured to decode each bit value of one of the respective memory pages using bit values read from at least one other one of the respective memory pages, adjacent to the one of the respective memory pages, by removing from consideration at least one possible signal level from among the plurality of possible signal levels based on the bit values read from the at least one other one of the respective memory pages, adjacent to the one of the respective memory pages.

2. The memory device of claim 1, wherein each of the plurality of possible signal levels represents the plurality of values according to a Gray code.

3. The memory device of claim 2, wherein:
the decoding circuitry is configured to compare each signal level in each memory cell to voltage thresholds in a set of voltage thresholds; and
when using bit values read from at least one other one of the respective memory pages, the decoding circuitry is configured to decode bit values for a subset of the plurality of possible signal levels using fewer than all voltage thresholds in the set of voltage thresholds.

4. The memory device of claim 2, wherein:
the decoding circuitry is further configured to assign to each respective decoded bit a respective value representing probability of the respective bit being a '1' or a '0', based on the bit values read from at least one other one of the respective memory pages, adjacent to the one of the respective memory pages; and
the memory device further comprises error correction circuitry that operates on the respective value representing the probability of the respective bit being a '1' or a '0', to correct the respective decoded bit.

5. The memory device of claim 4, wherein the respective value representing the probability of the respective bit being a '1' or a '0' is a log-likelihood ratio.

6. The memory device of claim 5, wherein the decoding circuitry is further configured to modify a magnitude of the log-likelihood ratio based on values read from at least one other one of the respective memory pages, adjacent to the one of the respective memory pages.

7. The memory device of claim 1, wherein the decoding circuitry is configured to use the bit values read from at least one of the respective memory pages, adjacent to the one of the respective memory pages, only after failure to decode without using the bit values read from the at least one other one of the respective memory pages.

8. The memory device of claim 7, wherein the decoding circuitry is configured to use the bit values read from at least one of the respective memory pages only after a threshold number of failures to decode without using the bit values read from the at least one other one of the respective memory pages.

9. The memory device of claim 7, wherein the decoding circuitry is configured to use the bit values read from at least one of the respective memory pages only after a result of decoding, without using the bit values read from the at least one other one of the respective memory pages, has accuracy below a threshold level of accuracy.

10. The memory device of claim 7, wherein the decoding circuitry is configured to use the bit values read from at least one of the respective memory pages only after performing an unsuccessful read-retry operation that retries the decoding using, in order, each of a plurality of entries in a read-retry table of voltage thresholds, without using the bit values read from the at least one other one of the respective memory pages.

11. The memory device of claim 10, wherein the decoding circuitry is further configured to assign to each respective bit being decoded a respective value representing probability of the bit being a '1' or a '0', based on the adjacent page bit values; and
the memory device further comprises error correction circuitry that operates on the respective value representing the probability of the bit being a '1' or a '0'.

12. The memory device of claim 10, wherein the decoding circuitry is further configured to use the bit values read from at least one of the respective memory pages only after:
performing an unsuccessful read-retry operation that retries the decoding using, in order, each of a plurality of entries in a read-retry table of voltage thresholds, without using the bit values read from the at least one other one of the respective memory pages; and
performing a threshold number of failures to decode without using the bit values read from the at least one other one of the respective memory pages.

13. The memory device of claim 1, wherein the decoding circuitry is configured to use the bit values read from the at least one other one of the respective memory pages, adjacent to the one of the respective memory pages, independent of the correctness of the bit values read from the at least one other one of the respective memory pages, adjacent to the one of the respective memory pages.

14. A decoding method for a memory device, the device having a plurality of memory cells, each memory cell storing one signal level from among a plurality of possible signal levels representing a plurality of values corresponding to a respective plurality of bits, bits in corresponding respective positions of significance across the plurality of memory cells constituting respective memory pages of the memory device, the decoding method comprising:
- reading bit values from at least one respective memory page; and
- using the bit values of the at least one other one of the respective memory pages, adjacent to the at least one respective memory page, to decode bit values of the at least one respective memory page by removing from consideration at least one possible signal level from among the plurality of possible signal levels based on the bit values read from the at least one other one of the respective memory pages, adjacent to the one of the respective memory pages.

15. The decoding method of claim 14, further comprising mapping the plurality of possible signal levels to the plurality of values using a Gray code.

16. The decoding method of claim 15 further comprising:
- comparing each signal level in each memory cell to voltage thresholds in a set of voltage thresholds; wherein:
- using bit values read from at least one other one of the respective memory pages comprises reading bit values for a subset of the plurality of possible signal levels using fewer than all voltage thresholds in the set of voltage thresholds.

17. The decoding method of claim 15 further comprising:
- assigning to each respective bit being decoded a respective value representing probability of the bit being a '1' or a '0', based on the adjacent page bit values; and
- correcting the respective bit based on the respective value representing the probability of the bit being a '1' or a '0'.

18. The decoding method of claim 17 wherein assigning to each respective bit a respective value representing the probability of the bit being a '1' or a '0', based on the adjacent page bit values, comprises assigning a log-likelihood ratio as the respective value representing the probability of the bit being a '1' or a '0'.

19. The decoding method of claim 14 further comprising:
- prior to using the bit values of the at least one other one of the respective memory pages, adjacent to the at least one respective memory page, to decode bit values of the at least one respective memory page, attempting unsuccessfully to decode the bit values of the respective memory page without using the bit values read from the at least one other one of the respective memory pages.

20. The decoding method of claim 19, wherein attempting unsuccessfully to decode the bit values of the at least one respective memory page comprises making a threshold number of unsuccessful attempts to decode without using the bit values read from the at least one other one of the respective memory pages.

21. The decoding method of claim 19, wherein attempting unsuccessfully to decode the bit values of the at least one respective memory page comprises decoding, without using the bit values read from the at least one other one of the respective memory pages, with an accuracy below a threshold level of accuracy.

22. The decoding method of claim 19, wherein attempting unsuccessfully to decode the bit values of the at least one respective memory page comprises performing an unsuccessful read-retry operation that retries the decoding using, in order, each of a plurality of entries in a read-retry table of voltage thresholds, without using the bit values read from the at least one other one of the respective memory pages.

23. The decoding method of claim 14, wherein using the bit values of the at least one other one of the respective memory pages, adjacent to the one of the respective memory pages, to decode bit values of the at least one respective memory page, is performed without regard to the correctness of the bit values read from the at least one other one of the respective memory pages, adjacent to the at least one respective memory page.

* * * * *